US010663128B2

(12) United States Patent
Abbott et al.

(10) Patent No.: US 10,663,128 B2
(45) Date of Patent: *May 26, 2020

(54) LIGHTING FIXTURE HAVING AN INTEGRATED COMMUNICATIONS SYSTEM

(71) Applicant: ExteNet Systems, Inc., Lisle, IL (US)

(72) Inventors: Eric B. Abbott, Lisle, IL (US);
Tormod Larsen, Lisle, IL (US);
Michael R. Alt, Lisle, IL (US);
Timothy P. Asta, Jr., Lisle, IL (US)

(73) Assignee: ExteNet Systems, Inc., Lisle, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/371,714

(22) Filed: Apr. 1, 2019

(65) Prior Publication Data

US 2019/0226672 A1  Jul. 25, 2019

Related U.S. Application Data

(63) Continuation of application No. 14/928,937, filed on Oct. 30, 2015, now Pat. No. 10,247,406.

(51) Int. Cl.
*F21S 8/08* (2006.01)
*H01Q 21/20* (2006.01)
(Continued)

(52) U.S. Cl.
CPC ............... *F21S 8/085* (2013.01); *F21S 9/02* (2013.01); *F21S 9/035* (2013.01); *H01Q 1/44* (2013.01); *H01Q 21/205* (2013.01); *H04B 1/38* (2013.01); *F21W 2131/103* (2013.01); *H01Q 1/246* (2013.01); *H01Q 1/42* (2013.01); *H01Q 21/28* (2013.01); *H04W 88/08* (2013.01); *Y02B 20/72* (2013.01)

(58) Field of Classification Search
CPC .... F21S 8/08; F21S 8/081; F21S 8/083; F21S 8/085; F21S 8/086; F21S 8/088; H05B 37/0272; F21W 2131/103
See application file for complete search history.

(56) References Cited

U.S. PATENT DOCUMENTS 5,641,939 A   6/1997 Tourigny
5,963,178 A  10/1999 Jones
(Continued)

OTHER PUBLICATIONS

International Search Report issued in related International Application No. PCT/US2016/057327, ISA/US dated Jan. 10, 2017, 2 pages.
(Continued)

*Primary Examiner* — Robert J May
(74) *Attorney, Agent, or Firm* — McDonnell Boehnen Hulbert & Berghoff LLP

(57) ABSTRACT

In one aspect, a lighting fixture includes a pole having a first section and a second section. The second section of the pole includes a radio frequency (RF) transparent material. The lighting fixture also includes a light housing coupled to the first section of the pole and a light source in the light housing. The lighting fixture further includes an antenna assembly in the second section of the pole. The antenna assembly is configured to wirelessly communicate with a user equipment device (UE). The lighting fixture also includes a communications backhaul interface coupled to the antenna assembly.

20 Claims, 8 Drawing Sheets

(51) Int. Cl.
*H01Q 1/44* (2006.01)
*H04B 1/38* (2015.01)
*F21S 9/02* (2006.01)
*F21S 9/03* (2006.01)
*H01Q 1/42* (2006.01)
*H01Q 1/24* (2006.01)
*H01Q 21/28* (2006.01)
*F21W 131/103* (2006.01)
*H04W 88/08* (2009.01)

(56) References Cited

U.S. PATENT DOCUMENTS

| | | | |
|---|---|---|---|
| 7,731,383 B2* | 6/2010 | Myer | F21S 8/083 |
| | | | 362/145 |
| 7,970,585 B2* | 6/2011 | Van Sloun | G01R 31/3662 |
| | | | 702/188 |
| 8,476,565 B2* | 7/2013 | Verfuerth | H05B 37/0272 |
| | | | 250/205 |
| 8,558,413 B1 | 10/2013 | Lepard | |
| 8,754,824 B2 | 6/2014 | Puente et al. | |
| 2007/0252528 A1 | 11/2007 | Vermuelen et al. | |
| 2008/0220729 A1* | 9/2008 | Avila | H01Q 1/06 |
| | | | 455/90.3 |
| 2011/0085322 A1 | 4/2011 | Myer | |
| 2011/0252111 A1 | 10/2011 | Murray et al. | |
| 2012/0143383 A1 | 6/2012 | Cooperrider et al. | |
| 2012/0154239 A1 | 6/2012 | Bar-Sade et al. | |
| 2013/0083516 A1 | 4/2013 | Yoon | |
| 2013/0103220 A1 | 4/2013 | Eaves | |
| 2014/0253733 A1 | 9/2014 | Norem et al. | |
| 2015/0259078 A1 | 9/2015 | Filipovic et al. | |
| 2015/0264742 A1 | 9/2015 | Merola | |
| 2015/0276192 A1* | 10/2015 | Kafry | F21V 23/003 |
| | | | 362/362 |
| 2015/0294431 A1 | 10/2015 | Fiorucci et al. | |
| 2016/0131358 A1* | 5/2016 | Spiro | H04W 88/08 |
| | | | 455/561 |

OTHER PUBLICATIONS

Written Opinion issued in related International Application No. PCT/US2016/057237, ISA/US dated Jan. 10, 2017, 7 pages.

Extended European Search Report and Written Opinion for European Application No. 16860509.5, dated May 24, 2019, 8 pages.

* cited by examiner

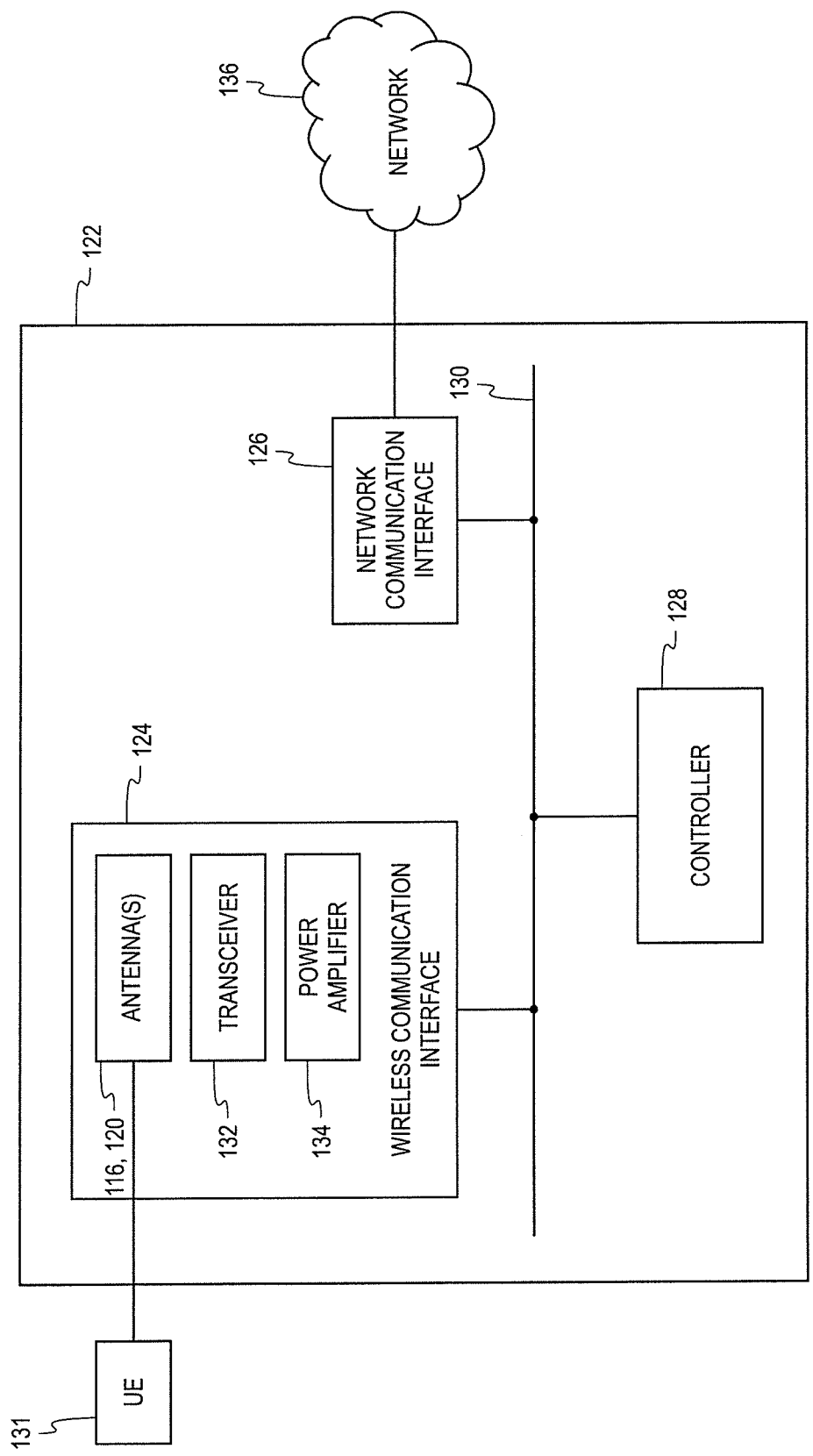

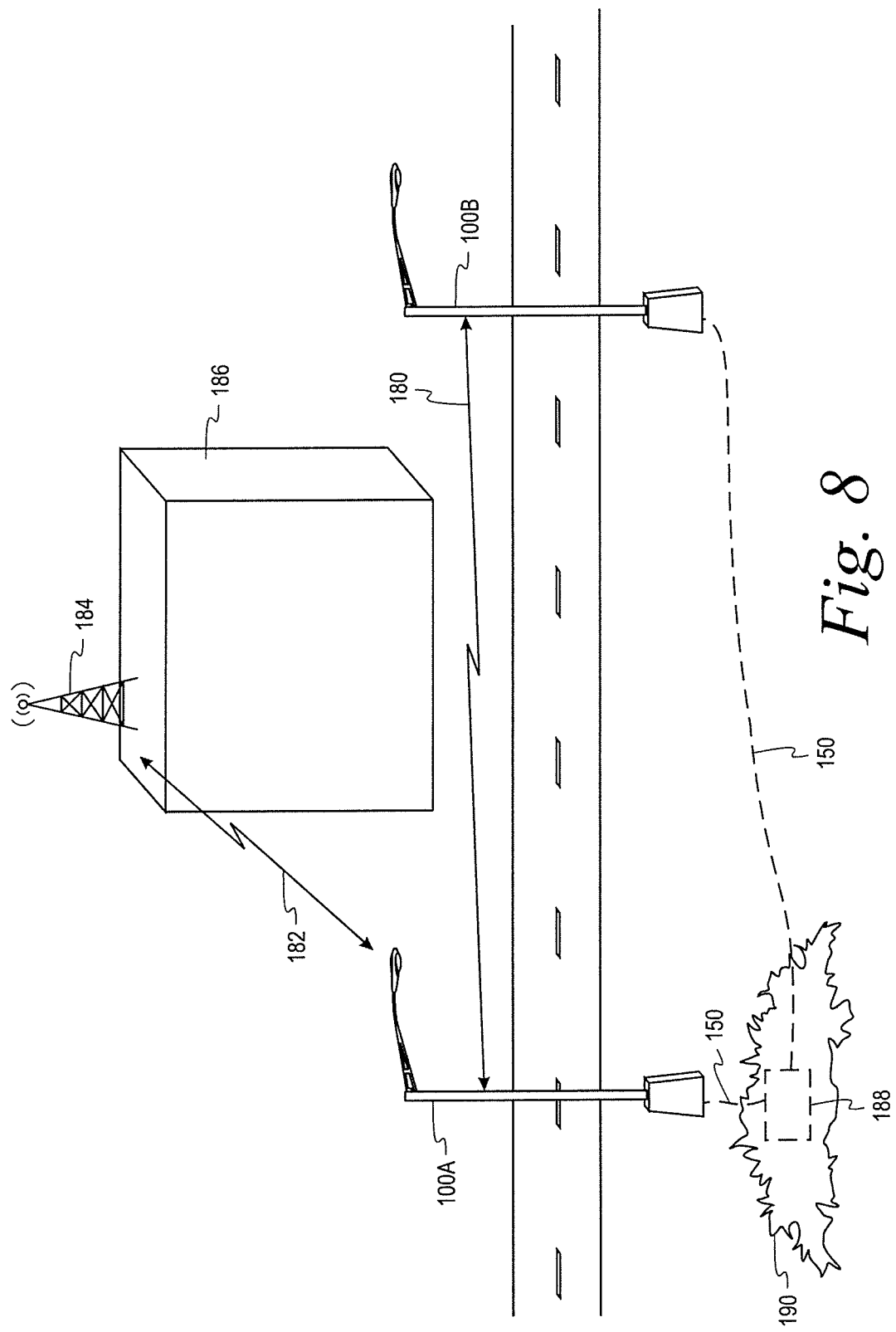

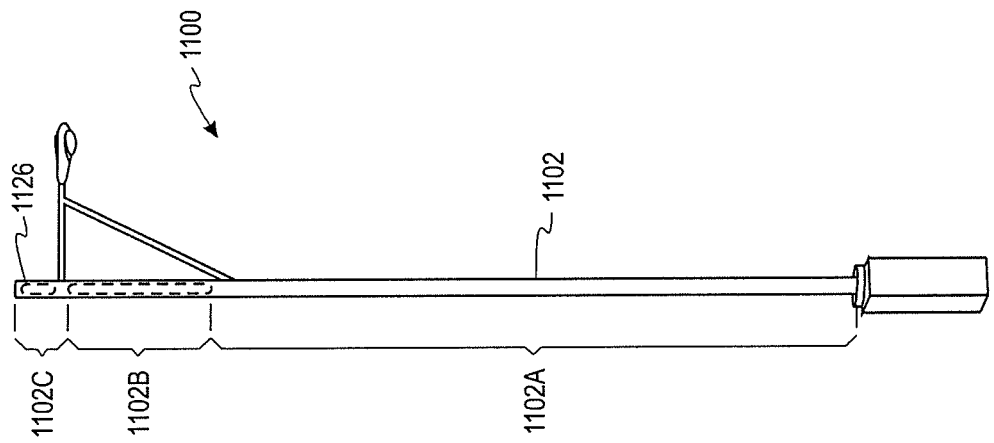
*Fig. 11*
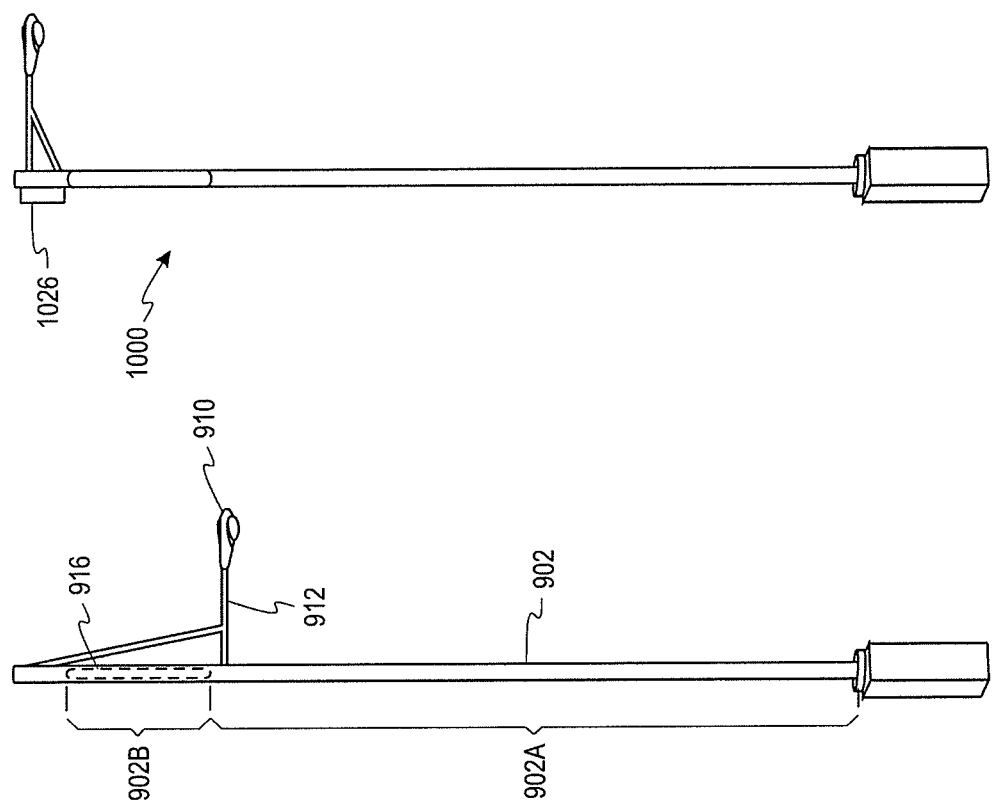
*Fig. 10*
*Fig. 9*

LIGHTING FIXTURE HAVING AN INTEGRATED COMMUNICATIONS SYSTEM

CROSS-REFERENCE TO RELATED APPLICATIONS

This application is a Continuation Application of U.S. patent application Ser. No. 14/928,937, filed Oct. 30, 2015, the contents of which are incorporated entirely herein by reference.

USAGE AND TERMINOLOGY

In this disclosure, with respect to all reasonable derivatives of such terms, unless otherwise specified and/or unless the particular context clearly dictates otherwise, each usage of "a" or "an" means at least one, and each usage of "the" means the at least one.

BACKGROUND

Lighting fixtures are a ubiquitous part of urban and rural landscapes. For example, lighting fixtures may be street lights located along roads and walkways to help motorists and pedestrians see better at night. In other contexts, lighting fixtures may be security lights employed to illuminate parking lots and other building environments for security and safety purposes. In still other contexts, lighting fixtures may be traffic signal lights employed to control traffic flow on streets.

SUMMARY

In a first aspect, a lighting fixture includes a pole having a first section and a second section. The second section of the pole includes a radio frequency (RF) transparent material. The lighting fixture also includes a light housing coupled to the first section of the pole and a light source in the light housing. The lighting fixture further includes an antenna assembly in the second section of the pole. The antenna assembly is configured to wirelessly communicate with a user equipment device (UE). The lighting fixture also includes a communications backhaul interface coupled to the antenna assembly.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 4 is a simplified block diagram of a communications module according to an example embodiment.

FIG. 8 is a perspective view of a network of lighting fixtures according to an example embodiment.

FIG. 9 is a perspective view of another lighting fixture according to an example embodiment.

FIG. 10 is a perspective view of another lighting fixture according to an example embodiment.

FIG. 11 is a perspective view of another lighting fixture according to an example embodiment.

Figure 1:
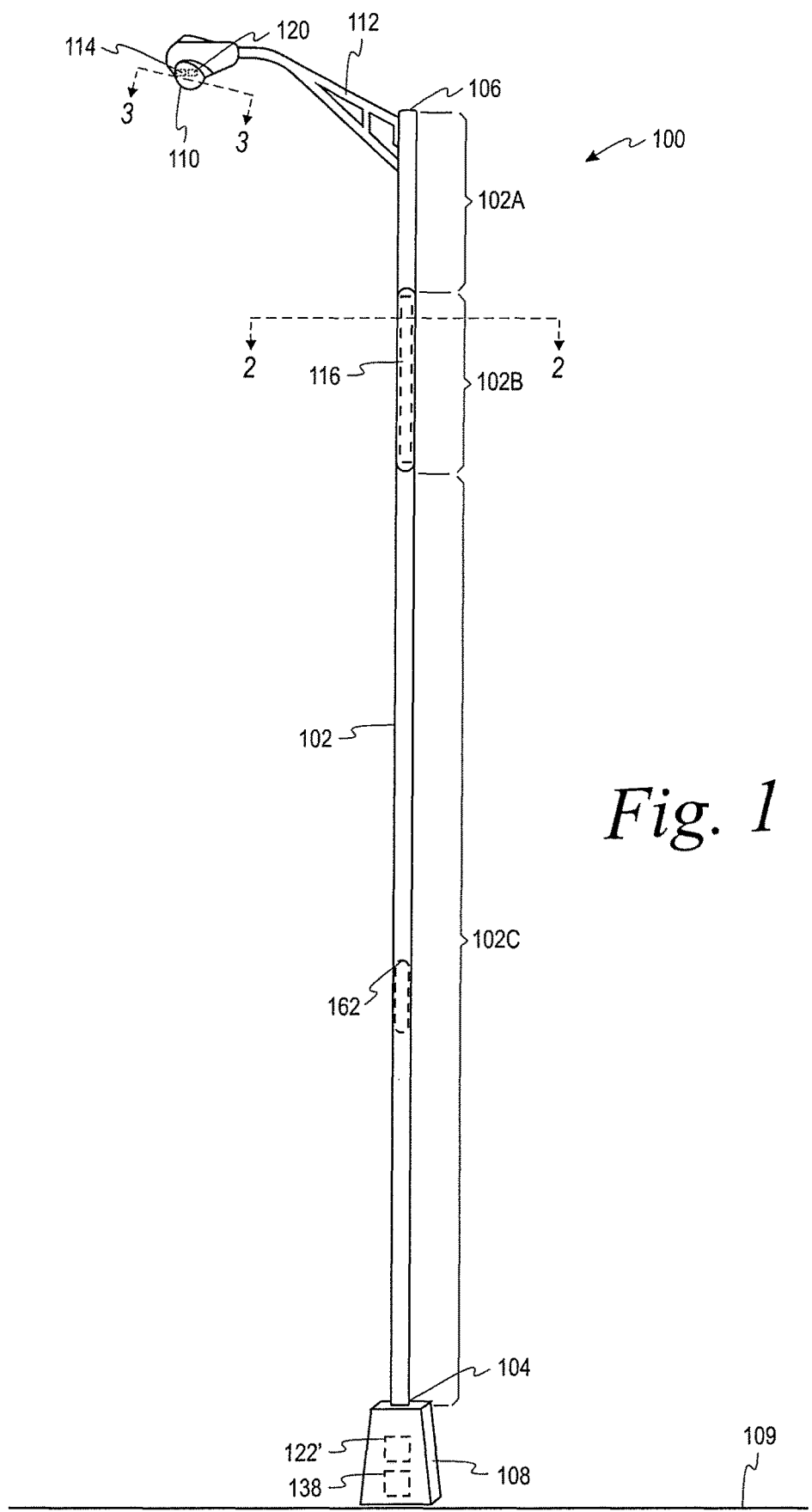
FIG. 1 is a perspective view of a lighting fixture according to an example embodiment.

While the invention is susceptible to various modifications and alternative forms, specific embodiments have been shown by way of example in the Figures and will be described in detail herein. It should be understood, however, that the invention is not intended to be limited to the particular forms disclosed. Rather, the invention is to cover all modifications, equivalents, and alternatives falling within the scope of the invention as defined by the appended claims. Other embodiments may include more or less of each element shown in a given Figure. Further, some of the illustrated elements may be combined or omitted. Yet further, an example embodiment may include elements that are not illustrated in the Figures.

DETAILED DESCRIPTION

The following detailed description describes various features and functions of the disclosed systems and methods with reference to the accompanying figures. The illustrative system and method embodiments described herein are not meant to be limiting. It will be readily understood that certain aspects of the disclosed systems and methods can be arranged and combined in a wide variety of different configurations, all of which are contemplated herein.

I. Overview

In cities around the world, demand for wireless communication services continues to grow as digital consumerism increases. This growing demand for wireless services has been fueled, at least in part, by decreasing mobile device costs, greater availability of wireless service plans, and heightened consumer expectations of nearly universal mobile connectivity. To address the growing demand for wireless communication services, wireless service providers have begun augmenting existing, traditional cellular base stations (i.e., large cells) with smaller cells having a shorter range. These small cells may also be referred to as picocells, femtocells, and microcells.

To help address the demand for wireless communication services, small cells could be provided on lighting fixtures such as, for example, street lights, security lights, and traffic signal lights. To do so, the wireless service providers might affix large, bulky communications network equipment (e.g., antennas) to an exterior of the lighting fixture and/or provide the equipment in large ground furniture adjacent to the lighting fixture. However, installing such equipment in this manner would create visually unattractive scenery. Indeed, some municipalities have passed zoning rules and regulations that impose limitations on the types of equipment that can be mounted to lighting fixtures in public spaces to manage aesthetics of the cityscape.

Mounting communications network equipment to the exterior of the lighting fixture may cause other problems as well. For example, some communications network technologies may be negatively impacted if the pole of the lighting fixture sways significantly. Sway may be more likely or severe when equipment is mounted to the exterior of the lighting fixture because the equipment may increase a surface area exposed to winds, and the equipment may create an uneven distribution of weight about the pole of the lighting fixture. Additionally, for example, ice may form on the equipment mounted to the exterior of the lighting fixture and may potentially fall on pedestrians below.

The present disclosure provides a lighting fixture having, among other things, integrated communications network features with a significantly improved aesthetics. In some aspects, the disclosure provides a lighting fixture in which at least some (or perhaps all) communications network equipment is housed in the lighting fixture. Thus, in some aspects, the lighting fixture may be aesthetically indistinguishable from a traditional lighting fixture, which omits communications network equipment.

According to additional or alternative aspects, the lighting fixture can include additional features that allow the lighting fixture to function as an integrated aggregation point to provide various city and/or commercial services including, for example, remote sensing, electronic displays, charging/docking stations, asset tracking, traffic management and data analytics, location beacons, atmospheric/weather analysis, assistance for the visually impaired, and video, audio, data, and voice services. Some or all of these additional features can be housed in the lighting fixture as well.

By locating various components and features in the lighting fixture, the overall appearance of the lighting fixture may more closely match or complement pre-existing lighting fixtures or desired aesthetics in a particular neighborhood. Further, by locating components and features in the lighting fixture, the public may be more likely to positively perceive the lighting fixture as a structure providing public benefits as opposed to an undesirable structure in their neighborhood (e.g., a surveillance structure).

II. Example Devices and Systems

FIG. 1 is a perspective view of a lighting fixture 100 according to an example embodiment. In the illustrated example, the lighting fixture 100 is shown in the form of a street light; however, it should be understood that the concepts described with respect to the example lighting fixture 100 can extend to apply to other types of lighting fixtures such as, for example, security lights and traffic signal lights.

As shown in FIG. 1, the lighting fixture 100 includes a pole 102 having a first end 104 and a second end 106. The first end 104 of the pole 102 is coupled to a base 108. The base 108 is configured to secure the first end 104 of the pole 102 to the ground 109 such that the pole 102 is maintained in an upright position. For example, the base 108 may include a foundation portion (not shown) that extends into the ground 109 to assist in securing the pole 102 in the upright position.

The lighting fixture 100 further includes a light housing 110 coupled to the pole 102. In the illustrated example, the light housing 110 is coupled to the pole 102 via an arm 112 that extends outwardly from the pole 102 at an elevated position off of the ground 109. In other examples, the lighting fixture 100 may omit the arm 112 such that the light housing 110 is coupled directly to the pole 102. For instance, in some examples, the light housing 110 may be coupled to the second end 106 of the pole 102. Additionally, although the illustrated example includes one light housing 110, the lighting fixture 100 may include more than one light housing 110 coupled to the pole 102 in other examples. Still further, although the arm 112 is coupled to the pole 102 adjacent to the second end 106 in the illustrated example of FIG. 1, it should be understood that the arm 112 can be coupled at other locations along the pole 102. Additional non-limiting examples of lighting fixture constructions are illustrated and described below with respect to FIGS. 9-11.

In the light housing 110 is a light source 114 configured to generate light. For example, the light source 114 can include one or more light emitting diodes (LEDs), incandescent bulbs, high-intensity discharge lamps (e.g., high pressure sodium lamps), etc. The light housing 110 can be configured to direct light generated by the light source 114 in one or more directions such as, for example, in a generally downward direction from the light housing 110 towards the ground 109.

As noted above, the lighting fixture 100 is configured to provide communications network functionalities. To do so, the lighting fixture 100 includes one or more communications network devices in the pole 102, the base 108, and/or the light housing 110 according to aspects of the disclosure. In particular, the lighting fixture 100 may include one or more antennas that are configured to wirelessly communicate with a user equipment device (UE) such as a cell phone, a wirelessly-equipped personal computer or tablet, a tracking device, a wireless sensor (e.g., an Internet of Things (TOT) sensor), or other devices equipped with wireless communication functionality (whether or not operated by a human user). Such wireless communications may be in the form of radio frequency (RF) communications over an air interface connection between the antenna(s) of the lighting fixture 100 and the UE.

To facilitate such RF communications between antenna(s) in the lighting fixture 100 and a UE outside of the lighting fixture 100, the lighting fixture 100 may include one or more RF transparent materials in select portions of the lighting fixture 100 where the antenna(s) are located. An RF transparent material may be any material that does not significantly alter the amplitude or phase of radio-frequency electromagnetic waves transmitted through it. For instance, the RF transparent material may be a dielectric material such as, for example, high-strength fluorinated plastics and/or non-conducting carbon fiber, among other possibilities. By employing an RF transparent material, the lighting fixture 100 may facilitate wireless RF communications through an exterior surface of the lighting fixture 100.

In other portions of the lighting fixture 100, other materials may be employed. These other materials may be non-RF transparent materials and/or materials conventionally employed in lighting fixtures such as, for example, aluminum, steel, concrete, a carbon composite, etc. In some implementations, these other materials may be selected based on one or more factors including, for example, strength characteristics, stiffness characteristics, weight, cost, ease of manufacture, and/or desired aesthetics. In other example implementations, the lighting fixture 100 may be manufactured by retrofitting an pre-existing structure made from conventional materials to incorporate the RF transparent materials in the select portions. Other example implementations are also possible.

In some aspects, the lighting fixture 100 includes a first antenna assembly 116 in the pole 102. Accordingly, to allow for RF communications between the first antenna assembly 116 and an external UE, at least a portion of the pole 102 is a RF transparent material. In the example of FIG. 1, the pole 102 includes a first section 102A, a second section 102B, and a third section 102C. In particular, the third section 102C is coupled to the base 108, the second section 102B is coupled to the third section 102C, and the first section 102A is coupled to the second section 102B. The first antenna assembly 116 is located in the second section 102B of the pole 102 and, thus, the second section 102B is made from the RF transparent material. The first section 102A and the third section 102C may be made from other materials such as those described above (e.g., any material conventionally used for a street light pole).

Figure 2:
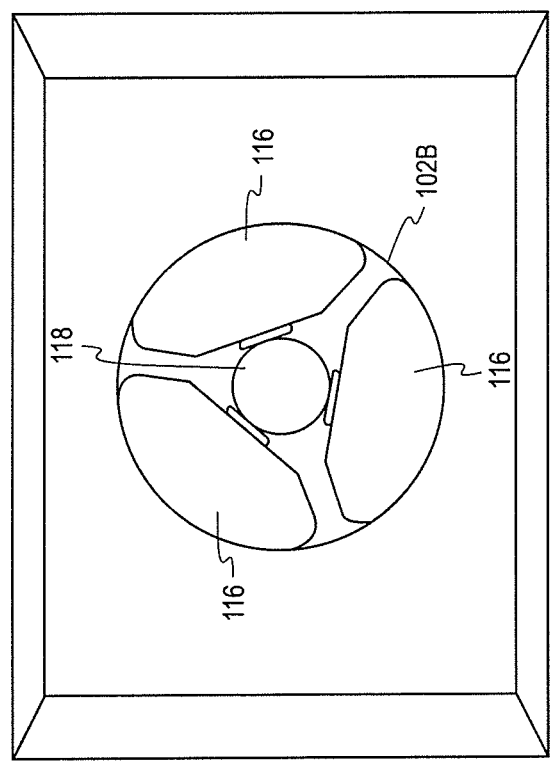
FIG. 2 is a sectional view of a lighting fixture shown in FIG. 1 according to an example embodiment.

FIG. 2 illustrates the first antenna assembly 116 in the second section 102B according to one example embodiment. In particular, FIG. 2 illustrates a sectional view of the lighting fixture 100 taken through the second section 102B as indicated by line 2 in FIG. 1. As shown in FIG. 2, the lighting fixture 100 includes a rod 118 extending axially within the second section 102B of the pole 102. In some examples, the rod 118 can be coupled to the first section 102A and the third section 102C of the pole 102. In general, the first antenna assembly 116 may include one or more antennas coupled to the rod 118. In some aspects, the first antenna assembly 116 may include a plurality of antennas radially mounted around a circumference of the rod 118 to provide an omnidirectional wireless communication coverage area around the lighting fixture 100. In FIG. 2, for example, the first antenna assembly 116 includes three antennas radially mounted around the circumference of the rod 118 at positions offset by approximately 120 degrees relative to one another.

In some examples, the antennas of the first antenna assembly 116 can include one or more micro-electromechanical systems (MEMS) antennas and/or laminated antennas. Additionally, for example, the antennas of the first antenna assembly 116 can be configured to support a multiple-input and multiple-out (MIMO) antenna configuration, a single-input and multiple-output antenna configuration (SIMO), a multiple-input and single-output antenna configuration (MISO), a single-input and single-output antenna configuration (SISO), combinations thereof, and/or the like.

In some aspects, the antennas of the first antenna assembly 116 can be configured to down-tilt relative to an axis parallel to the ground 109. For example, the first antenna assembly 116 can be coupled to the rod 118 in a manner that allows for mechanical down-tilt of the antennas. In additional or alternative examples, the first antenna assembly 116 can be configured to electrically down-tilt (e.g., by modifying characteristics of a signal phase of the antennas). In some implementations, the antennas can down-tilt between approximately 0 degrees and approximately 20 degrees. In other implementations, the antennas can down-tilt between approximately 0 degrees and approximately 10 degrees. Down-tilting the antennas of the first antenna assembly 116 may allow for improved RF signal control.

In some examples, the antennas of the first antenna assembly 116 can be down-tilted at a time of installation. In additional or alternative examples, the antennas of the first antenna assembly 116 can be dynamically down-tilted responsive to various conditions determined during operation of the lighting fixture 100. In some implementations, an operator onsite at the lighting fixture 100 may manually down-tilt the antennas of the first antenna assembly 116. In additional or alternative implementations, a controller may adjust the down-tilt of the first antenna assembly 116 by providing control signals to the first antenna assembly 116. For instance, an operator may remotely control the down-tilt of the first antenna assembly 116 by providing control signals to the lighting fixture 100 via network connectivity features (described below).

In additional or alternative aspects, the antennas of the first antenna assembly 116 can be configured to up-tilt relative to an axis parallel to the ground 109. For example, the first antenna assembly 116 can be coupled to the rod 118 in a manner that allows for mechanical up-tilt of the antennas. In additional or alternative examples, the first antenna assembly 116 can be configured to electrically up-tilt (e.g., by modifying characteristics of a signal phase of the antennas). In some implementations, the antennas can up-tilt between approximately 0 degrees and approximately 60 degrees. In other implementations, the antennas can down-tilt between approximately 0 degrees and approximately 45 degrees. The up-tilt of the antennas may be controlled in a manner similar to that described above with respect to the down-tilt of the antennas. Up-tilting the antennas of the first antenna assembly 116 may be beneficial in scenarios where, for example, the first antenna assembly 116 is configured to communicate with a UE located in or on a building.

In the illustrated example of FIG. 1, the first antenna assembly 116 is located in the second section 102B, which is positioned in a middle portion of the pole 102 between the first section 102A and the third section 102C. In some aspects, positioning the first antenna assembly 116 in the middle portion of the pole 102 can allow the first antenna assembly 116 to better direct and contain RF communications than, for example, positioning the first antenna assembly 116 at an upper portion of the pole 102. Additionally, for example, positioning the first antenna assembly 116 in the middle portion of the pole 102 can provide improved and more uniform aesthetics as compared to mounting an antenna to the top of the pole 102. As will be explained below, however, the first antenna assembly 116 can be position in the upper portion of the pole 102 in other examples.

As shown in FIG. 2, the second section 102B of the pole 102 encloses the first antenna assembly 116 and the rod 118 within an interior space of the pole 102. As such, the first antenna assembly 116 and the rod 118 might not be visible from outside the pole 102. To further enhance the aesthetics of the lighting fixture 100, the second section 102B may be shaped and sized to blend in with the first section 102A and/or the third section 102C. For example, in FIG. 1, the first section 102A, the second section 102B, and the third section 102C may all have a circumference with approximately the same dimensions. This approach may be utilized in implementations in which the pole 102 has a generally consistent size and shape from the first end 104 to the second end 106 (e.g., for a generally cylindrical shaped pole 102).

In other implementations, however, the pole 102 may have an irregular, a rounded, and/or a tapered shape along the exterior surface between the first end 104 and the second end 106. As one example approach to blending the sections 102A, 102B, and 102C in such implementations, the circumferential dimensions of the first section 102A and the second section 102B may be approximately the same at an interface between the first section 102A and the second section 102B, and the circumferential dimensions of the second section 102B and the third section 102C may be approximately the same at an interface between the second section 102B and the third section 102C. In this way, the transitions between the different sections 102A, 102B, and 102C may provide a generally smooth profile of the pole and be less noticeable. Stated differently, the surfaces of the first section 102A, the second section 102B, and the third section 102C may have contours that are generally flush and/or only slightly protrude at the interfaces between the sections 102A, 102B, 102C. It should be understood that the pole 102 may have other shapes and/or the interfaces between the sections 102A-102C may be differently shaped in other examples.

As noted above, the rod 112 in the second section 102B can be coupled to the first section 102A and the third section 102C and, thus, may assist in physically supporting the first section 102A and the arm 112. In some aspects, the second section 102B may be in the form of a sleeve that abuts against the first section 102A and the third section 102C but may not be fixedly coupled to the first section 102A and the third section 102C. In alternative aspects, the second section 102B can be fixedly coupled to the first section 102A and the third section 102C. In either case, the second section 102B can be configured to provide structural support to the first section 102A of the pole 102 and the arm 112 extending from the first section 102A.

According to some additional or alternative aspects of the disclosure, the lighting fixture 100 may include a second antenna assembly 120 in the light housing 110. The light housing 110 may thus contain both the second antenna assembly 120 for facilitating wireless communications and the light source 114 for illuminating an area adjacent to the lighting fixture 100. As such, the light housing 110 can be constructed from a material that is both sufficiently RF transparent for wireless communication purposes and sufficiently light transparent for illumination purposes. Examples of materials that can be employed for the light housing 110 include fiberglass, plastic, polyvinyl chloride (PVC), cloth mesh, and/or glass.

In some aspects, the second antenna assembly 120 can include one or more of the types of antennas described above with respect to the first antenna assembly 116. The light source 114 may include an LED light source to limit heat and wide-band interference common to gas-discharge lamps. The LED light source 114 may also reduce power consumption as compared to gas-discharge lamps.

Figure 3:
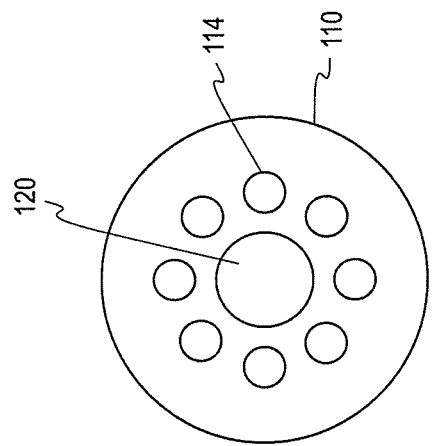
FIG. 3 is another sectional view of the lighting fixture shown in FIG. 1 according to an example embodiment.

FIG. 3 illustrates the second antenna assembly 120 and the light source 114 in the light housing 110 according to one example embodiment. In particular, FIG. 3 illustrates a sectional view of the light housing 110 as indicated by line 3 in FIG. 1. As shown in FIG. 3, the light source 114 includes a plurality of LED lights arranged around the second antenna assembly 120 in the light housing 110. Other example arrangements are also possible. Additionally, although the second antenna assembly 120 includes one antenna in the illustrated example, the second antenna assembly 120 can include more than one antenna in other examples. Similarly, the light source 114 can include a greater or a lesser number of lights in other examples.

In the illustrated example, the second antenna assembly 120 is directed in a generally downward direction (i.e., from the light housing 110 toward the ground 109). The second antenna assembly 120 thus may be configured to provide a directionally preferential wireless coverage to an area below the light housing 110. In such examples, the ground 109 may effectively limit the extent of coverage provided by the second antenna assembly 120. As a result, the second antenna assembly 120 may utilize less power to operate than antennas employed on a pole, which are intended to provide coverage to larger areas. For example, the second antenna assembly 120 may utilize less power to operate than the first antenna assembly 116 in implementations in which the coverage area of the first antenna assembly 116 is configured to be greater than the coverage area of the second antenna assembly 120. Although the lighting fixture 100 in FIG. 1 includes the first antenna assembly 116 and the second antenna assembly 120, the lighting fixture 100 may include one of the first antenna assembly 116 or the second antenna assembly 120 in other examples.

In general, the first antenna assembly 116 and/or the second antenna assembly 120 may provide one or more coverage areas, such as cells or sectors, in which the lighting fixture 100 may serve UEs. In turn, each of the antenna assemblies 116, 120 may be coupled with network infrastructure that provides connectivity with one or more transport networks, such as a public switched telephone network (PSTN) and/or a packet-switched network (PSN) (e.g., the Internet). With this arrangement, a UE within coverage of the lighting fixture 100 may engage in air interface communication with the lighting fixture 100 and may thereby communicate via the lighting fixture 100 with various remote network entities (such as, e.g., web servers, e-mail servers, media servers, gaming servers, etc.) or other UEs. As such, the lighting fixture 100 may function as a base station or access point in a wireless communications network.

The lighting fixture 100 may include one or more components which, together with the first antenna assembly 116 and/or the second antenna assembly 120, form a communications module 122 that assists with providing such wireless communications network functionalities. FIG. 4 illustrates an example communications module 122 according to one example embodiment. As shown in FIG. 4, the example communications module 122 includes a wireless communication interface 124, a network communication interface 126, and a controller 128, all of which can be integrated together in various ways or, as shown, interconnected with each other through a system bus, network, or other connection mechanism 130.

The wireless communication interface 124 includes the first and second antenna assemblies 116, 120, which are configured to transmit and receive over the air interface and thereby facilitate communication with served UEs (such as, e.g., an example UE 131 shown in FIG. 4). Further, the wireless communication interface 124 includes a transceiver 132 and a power amplifier 134 supporting air interface communication according to one or more air interface protocols. Examples of existing air interface protocols include, without limitation, Orthogonal Frequency Division Multiple Access (OFDMA) (e.g., Long Term Evolution (LTE) or Wireless Interoperability for Microwave Access (WiMAX)), Code Division Multiple Access (CDMA) (e.g., 1×RTT and 1×EV-DO), Global System for Mobile Communications (GSM), Enhanced Data GSM Environment (EDGE), and Wi-Fi (e.g., ZIGBEE®), among others. The communications module 122 can be configured to operate according to one air interface protocol or multiple air interface protocols.

The network communication interface 126 can include one or more wired and/or wireless network interfaces (such as an Ethernet interface) through which the lighting fixture 100 may transmit and receive data over a backhaul connection with network infrastructure (e.g., a switch or gateway, such as a mobile switching center (MSC), a packet data serving node (PDSN), a serving gateway (SGW), a packet-data network gateway (PGW), and/or a mobility management entity (MME) for instance) of a communications network 136. For example, the network communication interface 126 can provide a backhaul connection via one or more of fiber optics, a microwave radio link using dedicated spectrum or some of the cellular spectrum, Ethernet over power line, and/or line-of-sight millimeter wave (LOS-MMW). The network communication interface 126 also may be referred to as a backhaul interface.

The controller 128, which may be integrated with the wireless communication interface 124 or with one or more other components of the lighting fixture 100, may then be configured to manage communication over the air interface, including managing transmission of a wireless communication between the communication module 122 and the UE 131. The controller 128 can be implemented using hardware, software, and/or firmware. For example, controller 128 can include one or more processors and a non-transitory computer readable medium (e.g., volatile and/or non-volatile memory) that stores machine language instructions or other executable instructions. The instructions, when executed by the one or more processors, may cause controller 128, and thus the communication module 122, to carry out the various operations of the lighting fixture 100 described herein.

The communications module 122 shown in FIG. 4 is one non-limiting example of some components that can be included in the lighting fixture 100 to provide wireless communication between UEs and a communications network. In additional or alternative examples, the communications module 122 can omit one or more of the components shown in FIG. 4 and/or the communications module 122 can include one or more components not shown in FIG. 4. For instance, the communications module 122 may include one or more routers, gateways, and/or switches according to additional or alternative aspects. A router may, for example, handle localized mobility functions such as IP address translations in support of local handoffs to other wireless access points (e.g., other lighting fixtures 100). In general, the communications module 122 can include any radio resource devices that help the lighting fixture 100 to function as an access point, a small cell (e.g., picocell, femtocell, microcell, etc.), a macro cell, and/or a backhaul point for facilitating network services, wireless data, wireless video, wireless voice, voice over internet protocol (VoIP), emergency services, mesh network transmissions, single channel transmission, multi-channel transmissions, WiFi access, and other services.

In some examples, the components of the communications module 122 shown in FIG. 4 may be located in the pole 102, the base 108, the arm 112, and/or the light housing 110. For example, in FIG. 1, the first antenna assembly 116 is in the pole 102, the second antenna assembly 120 is in the light housing 110, and the network communication interface 126, the controller 128, the transceiver 132, and the power amplifier 134 (collectively indicated by element 122' in FIG. 1) are in the base 108. It should be understood that one or more of the components of the communications module 122 can be located in other parts of the lighting fixture 100 in other examples. In particular, for example, the network communication interface 126 may be located in the pole 102 and/or the arm 112 in some implementations in which the network communication interface 126 provides a wireless backhaul connection to the network 136.

As shown in FIG. 1, the lighting fixture 100 further includes a power module 138 in the base 108; however, the power module 138 (or parts thereof) can be located in other portions of the lighting fixture 100 in other examples. In one aspect, the power module 138 is configured to receive electrical power from an external power source and provide the received electrical power to the components of the lighting fixture 100. The components of the lighting fixture 100 can be coupled to the power module 138 by, for example, one or more electrical power busses (not shown) in the lighting fixture 100. The one or more electrical power busses can be wired (e.g., via rigid, semi-rigid, and/or flexible cables) and/or wireless (e.g., via inductive coupling).

Figure 5:
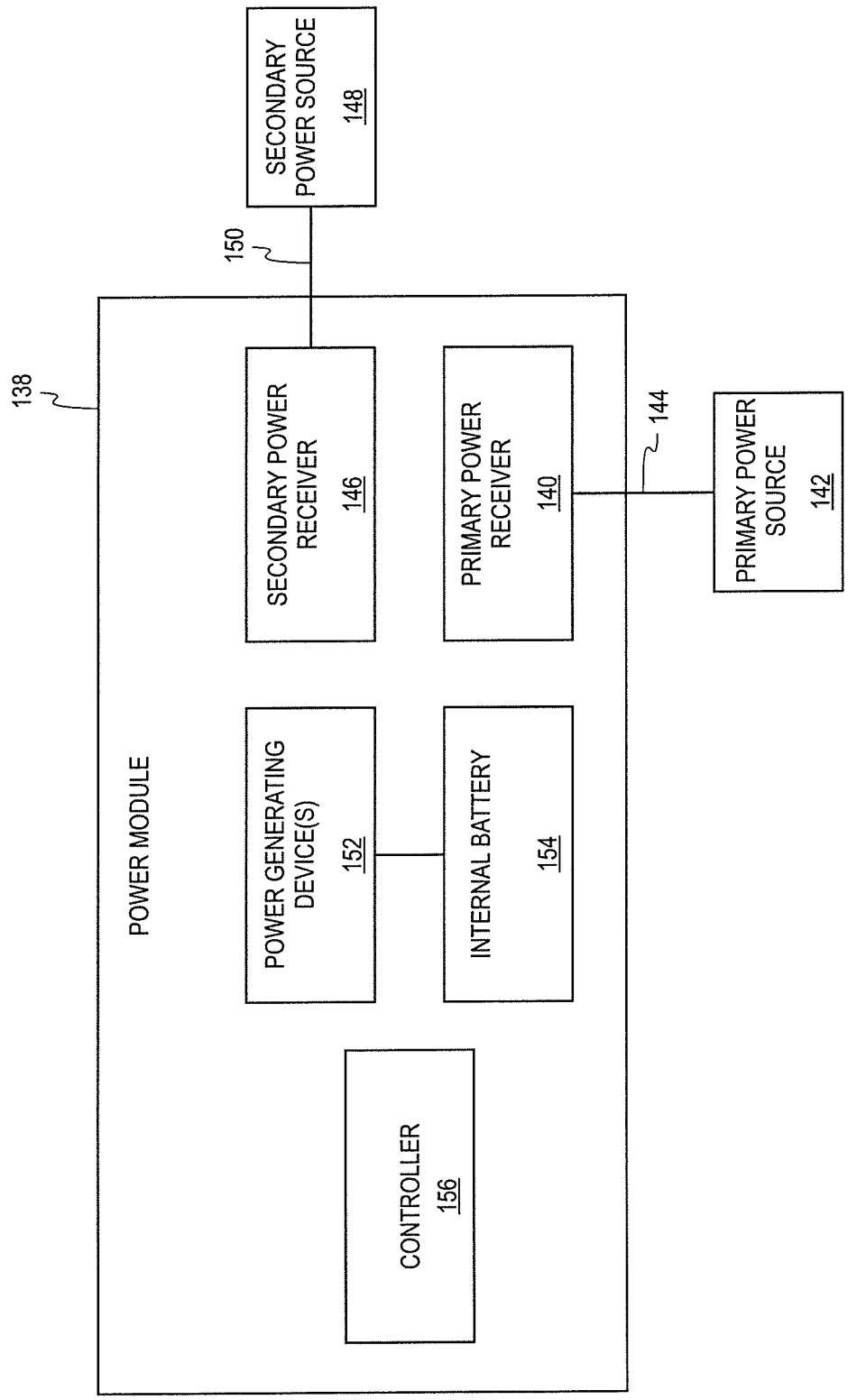
FIG. 5 is a simplified block diagram of a power module according to an example embodiment.

FIG. 5 is a simplified schematic diagram of the power module 138 according to an example embodiment. As shown in FIG. 5, the power module 138 includes a primary power receiver 140 for receiving power from an external, primary power source 142. The primary power receiver 140 is coupled to the primary power source 142 via a connection mechanism 144. The primary power receiver 140 also can be configured to convert the power received form the primary power source 142 into form(s) of electrical power suitable for operating one or more the components of the lighting fixture 100. For example, the primary power receiver 140 can include one or more rectifiers, transformers, inverters, voltage regulators, voltage converters, etc.

In one example, the primary power source 142 can be an electrical utility grid and the connection mechanism 144 can include one or more power cables such as, for instance, traditional copper cabling used to carry commercial electricity. In additional or alternative examples, the primary power source 142 can be a Power over Ethernet (PoE) source and the wired connection 144 can include one or more communication cables such as, for example, category 3 (CAT 3) cables, category 5 (CAT 5) cables, category 6 (CAT 6) cables, and/or fiber optic cables, among other possibilities. In one implementation, the primary power source 142 can transmit and the primary power receiver 140 can receive power using Packet Energy Transfer (PET) technology. PET provides for digitization and management of electrical power in discrete packets that can contain energy and/or data over the communication cable(s). One commercial supplier of such technology is VOLTSERVER®, which is currently located in East Greenwich, R.I.

Powering the lighting fixture 100 using communication cable(s) can provide a number of benefits over conventional power received from the electrical grid via power cable(s). In one aspect, it can be significantly easier and more cost efficient to install communication cable as compared to power cable. For instance, communication cables can be installed at lighting fixture 100 locations using micro-trenching techniques, whereas power cables generally require more substantial, larger trenches for installation. As a result, the lighting fixture 100 can be installed in locations that may have been cost-prohibitive or otherwise unfeasible for other lighting fixtures.

Additionally, for instance, freeing the lighting fixture 100 from the constraints of the electrical utility grid may allow installation of the lighting fixture 100 in a location that is more optimally positioned for providing wireless network operations. For example, the lighting fixture 100 can be installed at a location that allows the lighting fixture 100 to fill a gap in coverage provided by other nodes in the communications network 136. As another example, the lighting fixture 100 can be installed at a location with few obstructions that might impact coverage strength.

In another aspect, the need for an electrician to install, service, and/or maintain equipment of the power module 138 may be mitigated when the lighting fixture 100 is powered by PoE instead of the electrical grid. This may reduce costs not just at installation but over the entire life cycle of the lighting fixture 100.

Further still, powering the lighting fixture 100 via a PoE technology such as, for example, PET can provide an additional or alternative mechanism for the backhaul connection by the network communication interface 126.

Indeed, some PoE technologies (e.g., PET) can transmit data and electrical power over the same communications cable(s) 144. And, in some implementations, the primary power source 142 can include network infrastructure equipment (e.g., a router, switch, gateway, etc.) to connect the primary power source 142 to the communications network 136. The lighting fixture 100 can thus have network connectivity via the primary power source 142, which can help to assure high levels of availability and robust reliability in the event of a loss of network connectivity via other backhaul interface(s). Further, the network connectivity of the primary power source 142 may allow for remote power management monitoring as well as control of one or more subsystems of the lighting fixture 100 (e.g., the communications module 122, down-tilt of the first antenna assembly 116, and/or features of the lighting system 100 described below).

As noted above, the lighting fixture 100 may help to maintain public safety by illuminating streets (or, in other contexts, by providing traffic signals) and perhaps by providing other public safety functions described below. Thus, it may be beneficial to ensure that the lighting fixture 100 continues to operate in the event of a loss of power from the primary power source 138. To do so, the power module 138 can be configured to receive electrical power from an external, backup power source in some examples.

In the example of FIG. 5, the power module 138 includes a secondary power receiver 146 that is coupled to a secondary power source 148 via a connection mechanism 150. In some aspects, the secondary power source 148 can be a backup battery. In one example implementation, the connection mechanism 150 can include one or more communication cables and the secondary power source 148 can be configured to provide power to the power module 138 via a PoE technology. As noted above, communication cables can be more readily installed and, thus, provide greater flexibility in locating the lighting fixture 100 and/or the secondary power source 148. As such, the secondary power source 148 may be installed in a location that is hidden or obscured from view of pedestrians or motorists. For example, the secondary power source 148 can be installed behind bushes, buildings, alleys, and/or other remote places away from the lighting fixture 100. Locating the secondary power source 148 at a remote distance relative to the lighting fixture 100 may significantly improve the aesthetics of the lighting fixture 100 as compared to mounting the secondary power source 148 to an external surface of the lighting fixture 100 or housing the secondary power source 148 in ground furniture adjacent to the lighting fixture 100.

In some examples, the secondary power source 148 can be located up to approximately 10,000 feet away from the lighting fixture 100. Additionally, for example, because the secondary power source 148 using PoE can be located at such distances, multiple lighting fixtures 100 may be coupled to a common secondary power source 148 according to some example implementations.

According to additional or alternative aspects, the power module 138 can be configured to generate power independently of an external power source. The generated power can then be used to directly power one or more components of the lighting fixture 100 and/or the generated power can be stored for later use by the component(s) of the lighting fixture 100. To that end, the power module 138 includes a power generating device 152 and an internal battery 154 in the example of FIG. 5.

In one example, the power generating device 152 can generate power via a photovoltaic process that converts sunlight into electrical energy. In one implementation, for instance, the power generating device 152 can include a photovoltaic skin including a plurality of interlaced nanotubes. The photovoltaic skin can be configured to generate electrical energy responsive to incident light in the visual and/or the non-visual parts of the light spectrum (e.g., visible, infrared, and ultraviolet light). In some aspects, the photovoltaic skin can be formed on the pole 102, the base 108, the light housing 110, and/or the arm 112 via a coating process or the like. In this way, the lighting fixture 100 can employ photovoltaic power generation devices 152 that blend in with the aesthetics of the lighting fixture 100. It is contemplated, however, that the lighting fixture 100 can include other photovoltaic power technologies in other examples.

In another example, the power generating device 152 can be configured to generate power using the Seebeck Effect to convert differences in temperature into electrical energy. Accordingly, the power generating device 152 may include one or more thermoelectric generators located on the pole 102, the base 108, the light housing 110, and/or the arm 112. In one implementation, the thermoelectric generator(s) can include highly doped semiconductors made from bismuth telluride, lead telluride, calcium manganese oxide, or combinations thereof. In some aspects, the thermoelectric generator(s) may omit moving parts and, thus, may require little or no maintenance and have high reliability.

In yet another example, the power generating device 152 can include piezoelectric materials that generate power in response to mechanical strain on the lighting fixture 100. For instance, the piezoelectric materials can be located on the pole 102 and/or the arm 112 such that swaying of the lighting fixture 100 causes the power generating device 152 to generate power.

As noted above, the internal battery 154 can be coupled to the power generating device 152 to store electrical energy generated by the power generating device 152. According to additional or alternative aspects, the internal battery 154 may also be coupled to the primary power receiver 140 and/or the secondary power receiver 146 to store power received from the primary power source 142 and/or the secondary power source 148, respectively. The internal battery 154 may thus be utilized as a backup battery in the event of a power loss to the primary power source 140 and/or the secondary power source 148.

In still other examples, the power module 138 may omit the internal battery 154. For instance, in implementations in which the lighting fixture 100 is coupled to the electrical utility grid, the power generating device 152 may be configured to provide any excess power, which is not utilized by the components of the lighting fixture 100, back to the grid.

The power module 138 can further include a power controller 156 configured to manage the receiving, distributing, generating, and/or storing of electrical power in the lighting fixture 100. The power controller 156 can, for example, be configured to determine that power provided from the primary power source 142 to the primary power receiver 140 has been interrupted and, responsive to such determination, cause the secondary power receiver 146 to receive power from the secondary power source 148. As another example, the power module 138 can be configured to determine that primary power (i.e., from the primary power source 142) and/or secondary power (i.e., from the secondary power source) has been interrupted and, response to such determination, cause the internal battery 154 to provide power to the components of the lighting fixture 100.

In yet another example, the power controller 156 can be configured to determine when to turn on and off the light source 114 based on sensor measurements (as described below) and/or based on control signals received via the communications module 122. In some examples, the power controller 156 can determine a level of power from a plurality of potential levels of power based on such sensor measurements and/or control signals, and the power controller 156 may then cause the power module 138 to provide the determined level of power to a component of the lighting fixture 100. For instance, the power controller 156 can be configured to selectively control the amount of light generated by the light source 114 by varying the level of power provided to the light source 114. This may allow the power controller 156 to controllably adjust the amount of illumination provided by the light source 114 based on the ambient lighting conditions at the lighting fixture 100. Similarly, for instance, the power controller 156 can be configured to selectively control the size and/or signal strength of the wireless coverage area provided by the first antenna assembly 116 and/or the second antenna assembly 118 by controllably adjusting the level of power provided to the communications module 122. This may be useful, for example, in a scenario where there is expected to be fewer UEs in the vicinity of the lighting fixture 100 during certain times of day.

As noted above, the base 108 can provide a housing for various components of the lighting fixture 100 such as, for example, at least some parts of the communications module 122 and/or the power module 138. To facilitate installing, servicing, and maintaining such components, the base 108 can include a door. The door can have an open position that provides access to the components within the base 108 and a closed position that inhibits (or prevents) access to the components within the base 108. In some aspects, the door may be lockable in the closed position to prevent unauthorized access and tampering with the components in the base 108.

Locating the communications module 122 and/or the power module 138 (or parts thereof) in the base 108 may provide a number of benefits. For example, by locating the communications module 122 and/or the power module 138 in the base 108, these components are easily accessible by authorized personnel. In contrast to other lighting fixtures, there is a reduced need for ladders and/or bucket trucks to make repairs and/or upgrades to communications and/or power devices mounted at elevated positions on the lighting fixture. This saves technicians significant time and provides a substantially safer work environment.

Figure 6B:
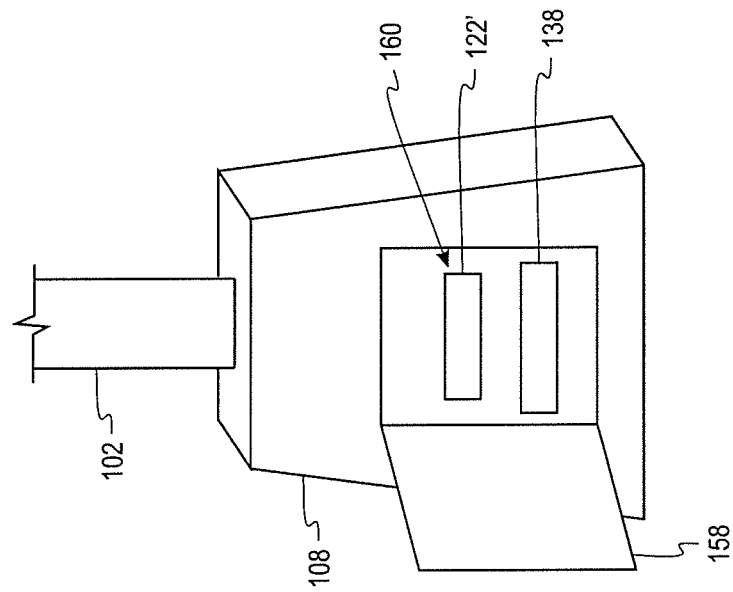
FIG. 6B is perspective view of the base of the lighting fixture in a second state according to an example embodiment.
Figure 6A:
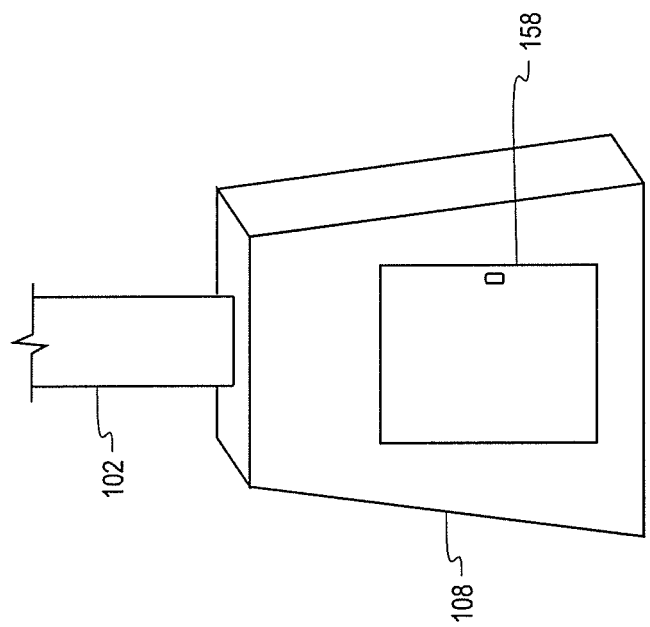
FIG. 6A is perspective view of a base of the lighting fixture in a first state according to an example embodiment.

FIGS. 6A-6B illustrate the base 108 according to one example embodiment. As shown in FIG. 6A, the base 108 includes a lockable door 158 in the closed position. Accordingly, in FIG. 6A, the door 158 inhibits access to the communications module 122 and/or the power module 138 in an interior space of the base 108. In FIG. 6B, the lockable door 158 is shown in the open position. Thus, as shown in FIG. 6B, access to the communications module 122 and/or the power module 138 is permitted via an opening 160.

As noted above, the lighting fixture 100 can also include one or more sensors 162 that can detect various events and/or conditions at or around the lighting fixture 100. In FIG. 1, the sensor(s) 162 are in the third section 102C of the pole 102. In other examples, at least one of the sensor(s) 162 can be located in other parts of the lighting fixture 100 and/or coupled to an exterior surface of the lighting fixture 100. Example sensors 162 include environmental sensors (e.g., particulate sensors, air quality sensors, etc.), weather sensors (e.g., temperature sensors, humidity sensors, precipitation sensors, etc.), bio-hazard sensors, nuclear isotope sensors, chemical sensors, smoke sensors, automobile accident sensors, traffic congestion sensors, pedestrian counter sensors, explosive material sensors, gunshot detectors, broken glass detectors, Internet of Things (IoT) sensors, radio frequency identification (RFID) sensors, ambient light sensors, etc.

In general, the sensor(s) 162 are configured to generate sensor data relating to a stimulus or a condition that the sensor(s) 162 can detect. The sensor(s) 162 can generate the sensor data continuously, at predetermined intervals, in response to the stimulus, and/or at random. In some aspects, the sensor(s) 162 may immediately transmit, via the communications module 122, the sensor data to a remote server that aggregates and/or processes such sensor data. In additional or alternative aspects, the sensor(s) 163 may transmit the sensor data to a controller (e.g., the controller 128), which may store the sensor data in memory for later transmission to the remote server. For example, the controller may store and then later transmit batches of sensor data on a periodic or scheduled basis. The server may then analyze the sensor data to provide data analytics and other information that may be relevant to municipalities, utilities, research institutions, governmental agencies, and other entities interested in collecting data at ground level. In other examples, the controller may process the sensor data and then responsively carry out one or more automated operations for the lighting fixture 100 (e.g., adjusting the amount of light generated by the light source 114 responsive to sensor data indicating a level of ambient light at the lighting fixture 100).

Accordingly, by integrating the types of sensor(s) 162 described above with the backhaul capabilities of the communications module 122, the lighting fixture 100 can provide significant public safety, city planning, environmental research, and other benefits. For example, upon detecting a car accident, the light lighting fixture 100 may immediately request emergency services faster than it would otherwise take an observer to dial 911. Additionally, for example, authorities may determine that a public event or demonstration is occurring based on sensor data provided by the lighting fixture 100 relating to pedestrian density in a certain area. Based on this information, the authorities may decide whether and to what extent additional police, fire, and/or medical personnel should be deployed to the area. Numerous other examples are also possible.

Additionally, integrating the sensor(s) 162 with backhaul capabilities in the lighting pole 100 may provide greater flexibility in the types of sensor(s) 162 that can be deployed in a city. For example, some sensor(s) 162 may have limited or no wireless communication capabilities. Typically, when such sensor(s) 162 are utilized in other contexts, a serviceman needs to periodically travel to the location of the sensor(s) 162 to manually read the sensor data and then manually send the sensor data to the remote server. As a result, employing such sensor(s) 162 in lighting fixtures was not considered feasible due to the cost and untimely manner of collecting sensor data from such sensor(s) 162. By integrating the sensor(s) 162 with the backhaul, the lighting fixture 100 can automatically transmit sensor data to the remote server with little or no human interaction. As such, the lighting fixture 100 may employ sensor(s) 162 that have limited or no wireless communication capabilities, which may beneficial because such sensor(s) 162 may be cheaper, smaller, and more energy efficient than sensor(s) 162 having wireless communication capabilities.

According to additional or alternative aspects, the lighting fixture 100 can include one or more auxiliary features that may benefit from the integrated network connectivity and/or integrated power features of the lighting fixture 100. In some implementations, the auxiliary features may help to provide various public and/or commercial services. Some examples of auxiliary features that can be included in or on the lighting fixture 100 include an electronic display device, an audio speaker, a microphone, an emergency telephone, a digital street sign, a kiosk, a charging/docketing station for UEs or other personal devices, a camera, combinations thereof, and the like. Other examples may also be possible.

Figure 7:
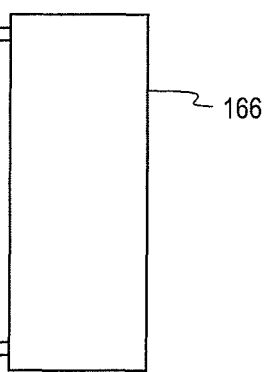
FIG. 7 is a perspective view of another lighting fixture according to an example embodiment.

FIG. 7 illustrates the lighting fixture 100 further including some example auxiliary features. As shown in FIG. 7, the lighting fixture 100 includes a first electronic display device in the form of a digital banner 166. In some examples, the digital banner 166 can display event notifications (e.g., parade information, festival information, direction information, etc.), traffic information (e.g., expected delay times, expected travel times, indications of roadside accidents, indications of road construction, detour information, etc.), public alerts (e.g., amber alerts, natural disaster alerts, etc.), seasonal decoration images, and/or parking information. In additional or alternative examples, the digital banner 166 can display advertising for commercial entities. The digital banner 166 can be configured to display information in the form of images, videos, and/or animations.

The digital banner 166 can be coupled to the power module 138 to receive power for operating the digital banner 166. In one example, the digital banner 166 can be coupled to the power module 138 via a wired connection embedded within a bracket or other mounting device, which secures the digital banner 166 to the pole 102, such that the wired connection is at least partially hidden from view.

Additionally, the digital banner 166 can be coupled to the communications module 122 and thus may be controllable via communications network 136. For example, an operator of the lighting fixture 100 can remotely change the information displayed on the digital banner 166 by transmitting image, video, and/or animation data to the digital banner 166 via the communications module 122. As such, the operator can rapidly, efficiently, and conveniently modify the information displayed on the digital banner 166 on a scheduled basis, a periodic basis, and/or on demand. This may be particularly beneficial in scenarios in which the digital banner 166 displays time-sensitive information such as, for example, amber alerts.

In some examples, a controller of the lighting fixture 100 and/or a remote controller on communications network 136 may automatically determine the information displayed on the digital banner 166 without any human interaction. For instance, a controller of the lighting fixture (e.g., the controller 128) and/or the remote controller may determine information for display based on sensor data received from the one or more sensors 162. In one implementation, for example, responsive to the sensor(s) 162 detecting a car accident, the digital banner 166 can automatically display information warning motorists of the accident and urging them to proceed with caution. Other example implementations are also possible.

In the example of FIG. 7, the lighting fixture 100 also includes a second electronic display in the form of a digital street sign 168. In one aspect, the digital street sign 168 can display a street name at a street intersection. In other aspects, the digital street sign can dynamically change to display other information such as information relating to a special event (e.g., by displaying the name of the event and an arrow pointing towards the event), information relating to a roadway detour (e.g., by displaying "Detour" and an arrow pointing towards the detour route), and/or any of the types of the information described above with respect to the digital banner 166. The digital street sign 168 can be coupled to the power module 138 and the communications module 122 in a manner similar to that described above with respect to the digital banner 166. Accordingly, the information displayed on the digital street sign 168 can be dynamically adjusted by an operator of the lighting fixture via the communications module 122 and/or in response to sensor data provided by the sensor(s) 162.

In the example of FIG. 7, the lighting fixture 100 further includes a speaker 170 in or on the pole 102. The speaker 170 can be configured to output audio information, which may be determined locally by the lighting fixture 100 and/or remotely by a controller communicating with the lighting fixture 100 via the communications module 122. In some examples, the audio information can relate to events, traffic, public alerts, etc. In other examples, the audio information can provide information that may assist the visually impaired (e.g., by indicating the status of traffic light signals). In still other examples, the audio information can be music. This may be beneficial in scenarios in which the lighting fixture 100 is located at or near a festival, concert, sporting event, and/or other entertainment venue. In some examples, the audio information may be configured to complement visual information displayed on the digital banner 166 and/or the digital street sign 168.

Because the speaker 170 can be controlled via the communications module 122 in some aspects, an operator of the lighting fixture 100 can rapidly, efficiently, and conveniently modify the audio information provided by the speaker 170 on a scheduled basis, a periodic basis, and/or on demand. Again, this may be particularly beneficial in scenarios in which the speaker 170 provides time-sensitive information.

The lighting fixture 100 shown in FIG. 7 still further includes a microphone 172 in or on the pole 102. In one example, the microphone 172 and the speaker 170 may be utilized for voice communications via the communications module 122. For instance, the microphone 172 and the speaker 170 may collectively provide an emergency telephone for contacting emergency services (e.g., police, fire, ambulance, etc.) and/or an operator of the lighting fixture 100.

As shown in FIG. 7, the lighting fixture 100 also includes a user interface that is configured to receive inputs from a user and provide outputs to a user. The user interface can thus include one or more input devices such as, for example, a keyboard, a mouse, a trackball, a switch, a dial, a touchscreen, combinations thereof, and/or the like. The user interface can also include one or more output devices such as, for example, a display screen, a touchscreen, an indicator light, an audio speaker, and/or a haptic device. In the example of FIG. 7, the user interface is shown in the form of a kiosk 174. Accordingly, the kiosk 174 is configured to display information responsive to an input received from a user. In some examples, the kiosk 174 can provide an interactive device for providing any of the visual and/or audio information described above in connection with the digital banner 166, the digital street sign 168, and/or the speaker 170. Additionally, for example, the kiosk 174 may be configured to display a street map, which may be interactive responsive to user inputs. In some aspects, the inputs received by the input devices may be communicated via the communications module 122 to a remote controller for remote processing and the output devices may then receive information (based on the user inputs) from the remote controller via the communications module 122 for output to the user.

The lighting fixture 100 shown in FIG. 7 further includes a camera 176 in or on the pole 102. The camera 176 can be configured to capture still images and/or video. The camera 176 can be configured to transmit the captured still images and/or video to a remote controller via the communications module 122. The camera 176 may thus provide enhanced public safety and security features for the lighting fixture 100.

The lighting fixture 100 shown in FIG. 7 still further includes a charging/docking interface 178 on the base 108. The charging/docking station 178 can be configured to couple a UE or other personal electronic device to the power module 138. For example, the charging/docking station 178 can include a standard AC outlet and/or a USB interface.

According to some aspects of the disclosure, a plurality of lighting fixtures 100 can be coupled to one another in a wired and/or wireless manner to form a mesh network and/or a local area network (LAN). FIG. 8 illustrates a first lighting fixture 100A coupled to a second lighting fixture 100B via a wireless connection 180. The first lighting fixture 100A and the second lighting fixture 100B can include any of the components described above with respect to the lighting fixture 100 shown in FIGS. 1-7.

In the example shown in FIG. 8, the first lighting fixture 100A has a wireless backhaul connection 182 to a communications network device 184 located on top of a building 186. In the illustrated example, the second lighting fixture 100B might not directly couple with the communications network device 184 due to, for example, the second lighting fixture 100B being located out of range of the network device 184 and/or the second lighting fixture 100B lacking a direct line of sight to the network device 184. In this example, the second lighting fixture 100B may instead indirectly couple to the network device 184 via the first lighting fixture 100A. As such, the first lighting fixture 100A and the second lighting fixture 100B can be configured to engage in bi-directional communication to facilitate backhaul communications from the second lighting fixture 100B to a communications network.

It should be understood that the network can include more than two lighting fixtures 100A, 100B in other examples. Additionally, it should be understood that the first lighting fixture 100A and the second lighting fixture 100B can be networked in different configurations in other examples. For example, the first lighting fixture 100A and the second lighting fixture 100B can be configured to form a network in a point-to-point (P-to-P) manner and/or a point-to-multipoint (P-to-MP) manner.

FIG. 8 also shows the first lighting fixture 100A and the second lighting fixture 100B coupled to a remote power source 188 (e.g., a primary power source and/or a secondary power source as described above) via one or more communication cables 150. As shown in FIG. 8, the power source 188 can be located away from the lighting fixtures 100A, 100B. In the illustrated example, the power source 188 is hidden among shrubs 190; however, the power source 188 can be at least partially hidden by other structures (e.g., buildings, alleys, etc.) or in plain sight in other examples. By coupling both lighting fixtures 100A, 100B to the power source 188, a distributed power network is formed for powering multiple lighting fixtures 100A, 100B.

III. Example Controller

The embodiments described herein may employ one or more controllers (e.g., the controller 128 and/or the power controller 156) for processing information and controlling aspects of a lighting fixture 100. As such, the controller(s) can include one or more processors. The processor(s) of a controller may be implemented as a combination of hardware and software elements. The hardware elements may include combinations of operatively coupled hardware components, including microprocessors, communication/networking interfaces, memory, signal filters, circuitry, etc. The processors may be configured to perform operations specified by the software elements, e.g., computer-executable code stored on computer readable medium. The processors may be implemented in any device, system, or subsystem to provide functionality and operation according to the present disclosure. The processors may be implemented in any number of physical devices/machines. For example, the controller may include one or more shared or dedicated general purpose computer systems/servers to provide the communications module 122, the power module 138, and other functionalities. Indeed, parts of the processing of the example embodiments can be distributed over any combination of processors for better performance, reliability, cost, etc.

The physical devices/machines can be implemented by the preparation of integrated circuits or by interconnecting an appropriate network of conventional component circuits, as is appreciated by those skilled in the electrical art(s). The physical devices/machines, for example, may include field programmable gate arrays (FPGA's), application-specific integrated circuits (ASIC's), digital signal processors (DSP's), etc. The physical devices/machines may reside on a wired or wireless network, e.g., LAN, WAN, Internet, cloud, near-field communications, etc., to communicate with each other and/or other systems, e.g., Internet/web resources.

Appropriate software can be readily prepared by programmers of ordinary skill based on the teachings of the example embodiments, as is appreciated by those skilled in the software arts. Thus, the example embodiments are not limited to any specific combination of hardware circuitry and/or software. Stored on one non-transitory computer readable medium or a combination of non-transitory computer readable media, the controller(s) may include software for controlling the devices and subsystems of the example embodiments, for driving the devices and subsystems of the example embodiments, for enabling the devices and subsystems of the example embodiments to interact with a human user (user interfaces, displays, controls), etc. Such software can include, but is not limited to, device drivers, operating systems, development tools, applications software, etc. A computer readable medium further can include the computer program product(s) for performing all or a portion of the processing performed by the example embodiments. Computer program products employed by the example embodiments can include any suitable interpretable or executable code mechanism, including but not limited to complete executable programs, interpretable programs, scripts, dynamic link libraries (DLLs), applets, etc. The processors may include, or be otherwise combined with, computer-readable media. Some forms of computer-readable media may include, for example, a hard disk, any other suitable magnetic medium, CD-ROM, CDRW, DVD, any other suitable optical medium, RAM, PROM, EPROM, FLASH-EPROM, any other suitable memory chip or cartridge, a carrier wave, or any other suitable medium from which a computer can read.

The controller(s) may also include databases for storing data. For example, the controller(s) can include a database for storing sensor data. Such databases may be stored on the computer readable media described above and may organize the data according to any appropriate approach. For examples, the data may be stored in relational databases, navigational databases, flat files, lookup tables, etc. Furthermore, the databases may be managed according to any type of database management software.

IV. Example Variations

The lighting fixture illustrated and described for FIGS. 1-8 provide some example embodiments of the present disclosure. It should be understood that modifications and variations to the above examples apparent to those skilled in the art are contemplated as falling within the spirit and scope of this disclosure.

For example, although the lighting fixture 100 is described and illustrated as having various components located at particular locations or in particular parts of the lighting fixture 100, one or more of such components can be at other locations or in other parts of the lighting fixture 100 according to other examples. For instance, although the first antenna assembly 116 is located in the pole 102 in the example of FIG. 1, the first antenna assembly 116 can be located in other parts of the lighting fixture 100 according to additional or alternative aspects. In one additional or alternative implementation, the first antenna assembly 116 can be located in the arm 112. In such implementation, the first antenna assembly 116 may be located in a section of the arm 112 that is made of an RF transparent material. The arm 112 may also include one or more other sections that are not an RF transparent material. Further, the first antenna assembly 116 may be mounted on a rod within the arm 112 as described above. In some examples, the first antenna assembly 116 may be configured to provide a wireless coverage area in a generally downward direction (i.e., in a direction from the arm 112 toward the ground 109) in scenarios where a UE is unlikely to be located above the arm 112. In other examples, the first antenna assembly 116 may provide omnidirectional wireless coverage. This may be useful in a scenario where it is anticipated that UE may take the form of an unmanned aerial vehicle (UAV), which may engage in wireless communication with the lighting fixture 100 while flying overhead.

As another example, although the lighting fixture 100 may be described and illustrated as having a certain number of a particular components in the above examples, the lighting fixture 100 can have a greater or lesser number of that component in other examples. For instance, although the lighting assembly 100 includes one first antenna assembly 116 in the pole 102, the lighting assembly 100 may include more than one first antenna assembly 116 in the pole 102 according to additional or alternative aspects of the disclosure.

As still another example, although the lighting fixture 100 may be described and illustrated as having components located or housed in the lighting fixture 100 in the examples above, the lighting fixture 100 can have one or more components attached to an exterior surface of the lighting fixture 100 in other examples. For instance, in one example, the network communication interface 126 may be mounted to an external surface of the lighting fixture 100.

The lighting fixture 100 illustrated in FIGS. 1-7 shows a lighting fixture according to one example embodiment of the present disclosure. The concepts described above can be extended to apply to a wide variety of lighting fixtures having different shapes, sizes, and/or styles. FIGS. 9-11 illustrate some additional non-limiting examples of lighting fixtures according to additional or alternative aspects of the present disclosure. It should be understood that the example lighting fixtures shown in FIGS. 9-11 can include any or all of the components and functionalities described above. Some example aspects of these additional or alternative examples will now be described.

FIG. 9 illustrates an example lighting fixture 900 having a pole 902 that includes a first section 902A and a second section 902B. The lighting fixture 900 also includes an antenna assembly 916 in the second section 902B in a manner similar to that described above for the first antenna assembly 116 in the lighting fixture 100. The second section 902B may thus include a RF transparent material to facilitate wireless communication with a UE external to the lighting fixture 900. The lighting fixture 900 also includes an arm 912 that couples a light housing 910 to the first section 902A of the pole 902. The lighting fixture 900 may thus be substantially similar to the lighting fixture 100, except that the second section 902B containing the antenna assembly 916 may be located above the first section 902A, which is coupled to the arm 912, in the lighting fixture 900 (instead of the opposite arrangement in the lighting fixture 100).

FIG. 10 illustrates an example lighting fixture 1000 that is substantially similar to the lighting fixture 100, except that the lighting fixture 1000 includes a backhaul interface 1026 coupled to an exterior surface of a pole 1002. The backhaul interface 1026 can, for example, provide a wireless backhaul connection to a communications network. In some examples, the wireless backhaul may operate at a frequency that is different than the frequency at which the first antenna assembly and/or the second antenna assembly operate.

FIG. 11 illustrates an example lighting fixture 1100 including a pole 1102 that has a first section 1102A, a second section 1102B, and a third section 1102C. The second section 1102B is between the first section 1102A and the third section 1102C. In this example, the second section 1102B can include a RF transparent material to help facilitate wireless communications between an antenna assembly in the section 1102B and an external UE. Additionally, in this example, the third section 1102C can include a RF transparent to help facilitate wireless communications between a backhaul interface in the third section 1102C and another node in a communications network.

Each of the systems, devices, or other entities described in this disclosure may or may not be a discrete entity. As such, each of the described entities may be made up of multiple discrete entities. Further, two or more of the described entities may be combined into a single discrete entity.

Although some of the acts and/or functions described in this disclosure have been described as being performed by a particular entity, such acts and/or functions may be performed by any entity, such as those described in this disclosure. Further, although the described acts and/or functions have been recited in a particular order, the acts and/or functions need not be performed in the order recited. However, in some instances, it may be desired to perform the acts and/or functions in the order recited. Also, not all of the described acts and/or functions need to be performed to achieve one or more of the benefits provided by this disclosure, and therefore not all acts and/or functions are required.

Although certain variations have been discussed in connection with one or more example of this disclosure, such variations may also be applied to all of the other examples of this disclosure as well. Although select examples of this disclosure have been described, alterations and permutations of these examples will be apparent to those of ordinary skill in the art. Other changes, substitutions, and/or alterations are also possible without departing from the invention in its broader aspects as set forth in the following claims.

We claim:

1. A lighting fixture, comprising:
a pole having a first section, a second section, and a third section, wherein the second section of the pole comprises a first radio frequency (RF) transparent material and the third section of the pole comprises a second RF transparent material;
a light housing coupled to the first section of the pole;
a light source in the light housing;
a first antenna assembly in the second section of the pole, wherein the first antenna assembly is configured to wirelessly communicate with a user equipment device (UE); and
a communications backhaul interface coupled to the first antenna assembly,
wherein the third section includes a second antenna assembly or the communications backhaul interface.

2. The lighting fixture of claim 1, further comprising a rod axially disposed within the second section of the pole, wherein the first antenna assembly is mounted to the rod and the second section encloses the rod and the first antenna assembly.

3. The lighting fixture of claim 2, wherein the first antenna assembly comprises three or more antennas radially mounted around a circumference of the rod.

4. The lighting fixture of claim 1, wherein the communications backhaul interface is configured to wirelessly communicate with a communications network over an air interface.

5. The lighting fixture of claim 4, wherein the communications backhaul interface is in the third section.

6. The lighting fixture of claim 1, wherein the first section and the second section have approximately the same circumference.

7. The lighting fixture of claim 1, further comprising:
a base coupled to the pole; and
a radio resource device in the base, wherein the first antenna assembly is coupled to the communications backhaul interface via the radio resource device.

8. The lighting fixture of claim 1, wherein the second antenna assembly is disposed in the light housing, wherein the light housing comprises a third RF transparent material that encloses the second antenna assembly and the light source.

9. The lighting fixture of claim 1, further comprising a power module coupled to a primary power source via a power cable.

10. The lighting fixture of claim 9, wherein the power module is coupled to a backup battery via a communications cable, wherein the backup battery is remotely located relative to the lighting fixture.

11. The lighting fixture of claim 1, further comprising a power module coupled to a primary power source, via a communications cable, to receive electrical power using power over Ethernet.

12. The lighting fixture of claim 1, wherein the first section of the pole comprises a photovoltaic material that is configured to convert sunlight into electrical energy.

13. The lighting fixture of claim 1, further comprising:
at least one sensor selected from the group consisting of: a temperature sensor, a humidity sensor, a traffic congestion sensor, an automobile accident sensor, a pedestrian counter sensor, a bio-hazard sensor, and a nuclear isotope sensor,
wherein the at least one sensor is configured to determine sensor data and communicate the determined sensor data to a remote processor via the communications backhaul interface.

14. The lighting fixture of claim 1, further comprising an electronic display device coupled to the pole, wherein the electronic display device is configured to display information received via the communications backhaul interface.

15. The lighting fixture of claim 1, further comprising a kiosk configured to display information responsive to an input received from a user.

16. The lighting fixture of claim 1, further comprising a camera in the pole and coupled with the backhaul interface, wherein the camera is configured to transmit a video stream from the camera to a remote processor via the backhaul interface.

17. The lighting fixture of claim 1, further comprising a controller configured to controllably adjust a down-tilt of the first antenna assembly.

18. The lighting fixture of claim 1, wherein a coverage area of the first antenna assembly is configured to be different from a coverage area of the second antenna assembly.

19. A lighting fixture, comprising:
a pole having a first section and a second section, wherein the second section of the pole comprises a radio frequency (RF) transparent material;
a light housing coupled to the first section of the pole;
a light source in the light housing;
an antenna assembly in the second section of the pole, wherein the antenna assembly is configured to wirelessly communicate with a user equipment device (UE);
a communications backhaul interface coupled to the antenna assembly;
a base coupled to the pole; and
a radio resource device in the base, wherein the first antenna assembly is coupled to the communications backhaul interface via the radio resource device,
wherein the base includes a lockable access door having an open position and a closed position, the lockable access door inhibits access to the radio resource device when in the closed position, and the lockable access door allows access to the radio resource device when in the open position.

20. A lighting fixture, comprising:
a pole having a first section and a second section, wherein the second section of the pole comprises a radio frequency (RF) transparent material;
a light housing coupled to the first section of the pole;
a light source in the light housing;
an antenna assembly in the second section of the pole, wherein the antenna assembly is configured to wirelessly communicate with a user equipment device (UE); and
a communications backhaul interface coupled to the antenna assembly,
wherein the first section of the pole comprises a thermoelectric material that is configured to convert a difference in temperature between an interior of the pole and an exterior of the pole into electrical energy.

* * * * *